(12) United States Patent
Smith

(10) Patent No.: US 9,044,106 B1
(45) Date of Patent: Jun. 2, 2015

(54) STORAGE AND RETRIEVAL SYSTEM AND METHODS

(71) Applicant: John T. Smith, Harmon, IL (US)

(72) Inventor: John T. Smith, Harmon, IL (US)

(*) Notice: Subject to any disclaimer, the term of this patent is extended or adjusted under 35 U.S.C. 154(b) by 0 days.

(21) Appl. No.: 13/896,069

(22) Filed: May 16, 2013

Related U.S. Application Data

(60) Provisional application No. 61/648,002, filed on May 16, 2012.

(51) Int. Cl.
| | |
|---|---|
| A47B 49/00 | (2006.01) |
| A47B 77/16 | (2006.01) |
| A47F 3/08 | (2006.01) |
| A47F 5/00 | (2006.01) |
| A47F 1/00 | (2006.01) |
| B65G 15/00 | (2006.01) |
| B65G 17/00 | (2006.01) |
| B65G 19/00 | (2006.01) |
| G07F 11/00 | (2006.01) |
| B65H 1/00 | (2006.01) |
| A47F 3/06 | (2006.01) |
| A47B 81/06 | (2006.01) |

(52) U.S. Cl.
CPC ................ *A47F 3/06* (2013.01); *A47B 49/008* (2013.01); *A47B 81/06* (2013.01)

(58) Field of Classification Search
CPC .. A47B 49/008; A47B 49/002; A47B 63/067; A47F 3/11; B65G 1/127; B65G 21/22; B65G 21/20; B65G 21/2045

USPC .............. 312/266–268, 91, 97, 134; 211/119, 211/121, 122; 221/119, 121, 122
See application file for complete search history.

(56) References Cited

U.S. PATENT DOCUMENTS

| | | | | |
|---|---|---|---|---|
| 3,199,658 | A | * | 8/1965 | Graber et al. ................. 211/121 |
| RE25,919 | E | * | 11/1965 | Anders .......................... 312/268 |
| 3,236,577 | A | * | 2/1966 | Woodward et al. ........... 312/268 |
| 3,290,104 | A | * | 12/1966 | Brautovich ................... 312/194 |
| 3,720,451 | A | * | 3/1973 | Anders .......................... 312/268 |
| 4,877,121 | A | * | 10/1989 | Yamashita et al. ......... 198/475.1 |
| 4,942,290 | A | * | 7/1990 | Frerking ....................... 235/381 |
| 5,431,299 | A | * | 7/1995 | Brewer et al. .................... 221/2 |
| 6,854,815 | B1 | | 2/2005 | Smith |
| 7,194,333 | B2 | | 3/2007 | Shoenfeld |
| 7,564,349 | B2 | | 7/2009 | Robey |
| 7,743,930 | B2 | * | 6/2010 | Krohn ......................... 211/1.51 |
| 8,355,962 | B2 | | 1/2013 | Delaney et al. |
| 2011/0101837 | A1 | * | 5/2011 | Solomon .................... 312/319.1 |

* cited by examiner

*Primary Examiner* — Janet M Wilkens
*Assistant Examiner* — Andrew Roersma
(74) *Attorney, Agent, or Firm* — Hamilton IP Law, PC; Jay R. Hamilton; Charles A. Damschen

(57) ABSTRACT

An illustrative embodiment of a storage and retrieval system may include a storage assembly supported by a plurality of frame members. The storage assembly may include a plurality of storage members that may be engaged with one another such that each storage member may selectively move along a predetermined path. The exterior of the storage and retrieval system may include a front exterior panel that may be configured with an access port therein for interacting with items positioned on the storage members. The exterior may also include a first and/or second display, scanner, and one or more door flaps to allow/prevent access to the interior of the storage and retrieval system through the access port.

16 Claims, 10 Drawing Sheets

STORAGE AND RETRIEVAL SYSTEM AND METHODS

CROSS REFERENCE TO RELATED APPLICATIONS

Applicant states that this nonprovisional patent application claims priority under 35 U.S.C. 119(e) from provisional U.S. Pat. App. No. 61/648,002 filed on May 16, 2012, which is incorporated by reference herein in its entirety.

FIELD OF THE INVENTION

The present invention relates generally to product shelving, display, storage, and/or retrieval.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. §1.171 (d)

A portion of the disclosure of this patent document contains material which is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

DESCRIPTION OF THE PRIOR ART

Retail stores commonly display merchandise on fixed-position shelves for viewing and selection by a consumer. However, such use of conventional shelves has certain drawbacks and disadvantages to both the store and the consumer. For example, use of conventional shelves to display merchandise can result in inefficient use of floor space because it limits the useable heighth of shelving to that which the consumer can reach. Space above this height is either not used or must be accessed by store personal with a ladder. Use of conventional shelves also presents obstacles to consumers who cannot reach the top or bottom shelves; such as consumers in wheelchairs or mobile carts, consumers with certain disabilities or disabling injuries, and consumers that are simply shorter than average.

Shelves configured for vertical carousel rotation present the potential to use the space above conventional fixed-position shelves for storing merchandise that can be brought to all consumers. A variety of carousel shelving units are known and have been used in a variety of settings for various purposes. For example, U.S. Pat. Nos. 2,603,547; 2,442,070; 1,680,035; 4,314,647; 2,703,643; 3,299,658; 3,298,536; all of which are incorporated by reference herein, disclose vertical carousel shelving units of different configurations, some of which are intended to display merchandise in retail stores.

Additionally, U.S. Pat. No. 6,119,880 issued to Applicant discloses a vertically oriented carousel shelving unit.

BRIEF DESCRIPTION OF FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limited of its scope, the invention will be described and explained with additional specificity and detail through the use of the accompanying drawings.

DETAILED DESCRIPTION OF THE INVENTION

Figure 1:
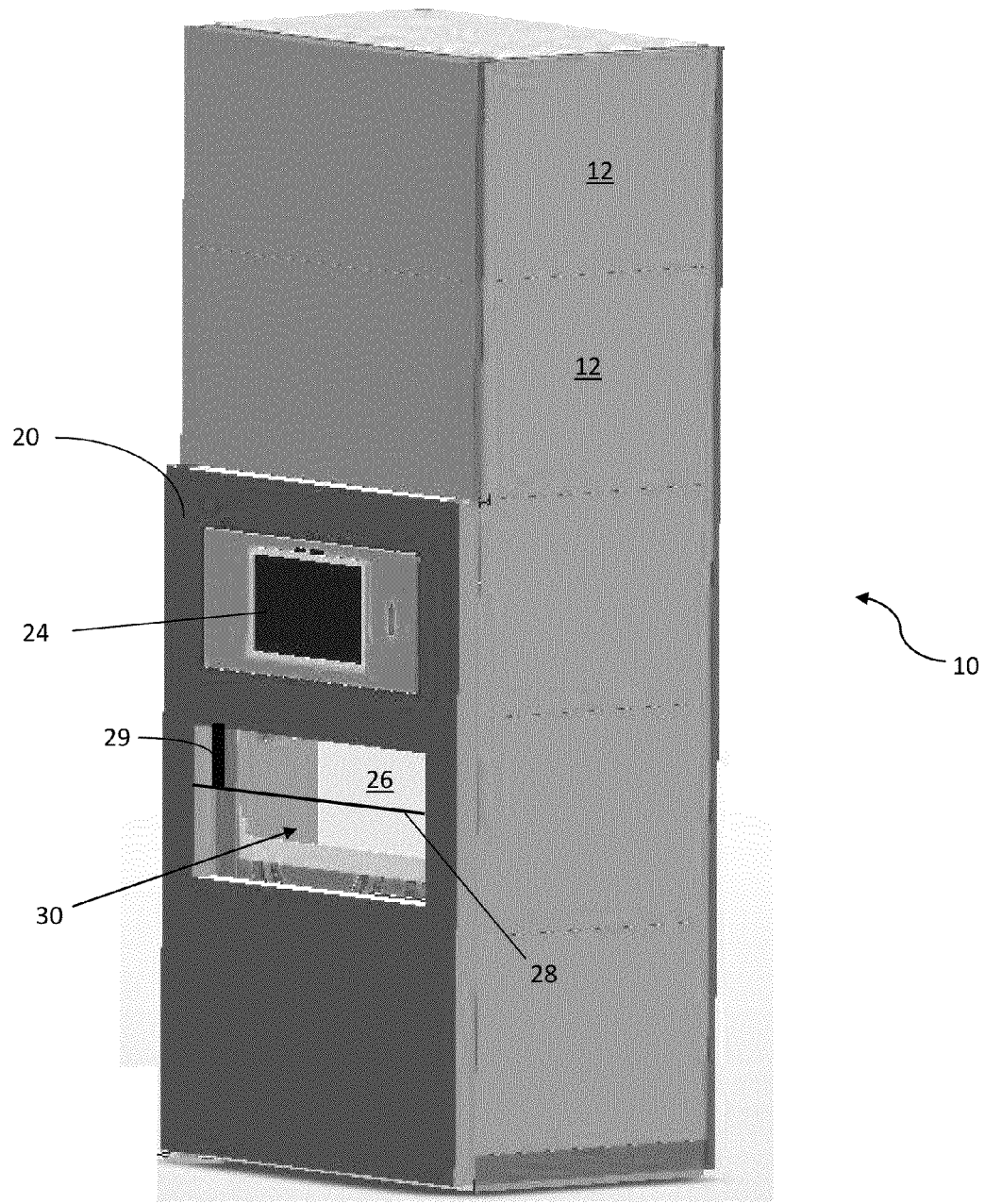
FIG. 1 provides a perspective view of an illustrative embodiment of a storage and retrieval system.

| Element Description | Element Number |
|---|---|
| Storage and retrieval system | 10 |
| Exterior panel | 12 |
| Frame member | 14 |
| Front exterior panel | 20 |
| Access port | 22 |
| Scanner | 23 |
| First display | 24 |
| Second display | 25 |
| Door flap | 26 |
| Lower door flap | 26a |
| Pivot mechanism | 27 |
| Storage assembly | 30 |
| Side plate | 31 |
| Guide | 31a |
| Drive keeper | 31b |
| Storage member | 32 |
| Side surface | 32a |
| Bottom surface | 32b |
| Front ledge | 32c |
| Back wall | 32d |
| Partition | 32e |
| Drive member | 36 |

DETAILED DESCRIPTION OF THE INVENTION

| Element Description | Element Number |
|---|---|
| Coupling member | 37 |
| Positioning assembly | 40 |
| Plate | 42 |
| Pin | 43 |
| Fixed arm | 44 |
| Roller | 45 |
| Pivot arm | 46 |
| Connector | 47 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance. Further, although some figures included herewith show various dimensions of some features of certain illustrative embodiments of the present invention, such dimensions are for illustrative purposes only and in no way limits the scope of the present disclosure. The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appending claims. Various inventive features are described below that can each be used independently of one another or in combination with other features.

Referring now to the drawings, wherein like reference numerals designate identical or corresponding parts throughout the several views, FIG. 1 provides a perspective view of a first illustrative embodiment of a storage and retrieval system 10 is shown in FIG. 1. Broadly, the illustrative embodiment of a storage and retrieval system 10 facilitates better use of floor space by making multiple items available at a convenient location for a user, generally adjacent an access port 22 positioned in a front exterior panel 20, as described in further detail below. A plurality of exterior panels 12 may be engaged with one or more frame members 14 to provide a useful and/or aesthetically pleasing exterior to the storage and retrieval system 10.

Figure 3A:
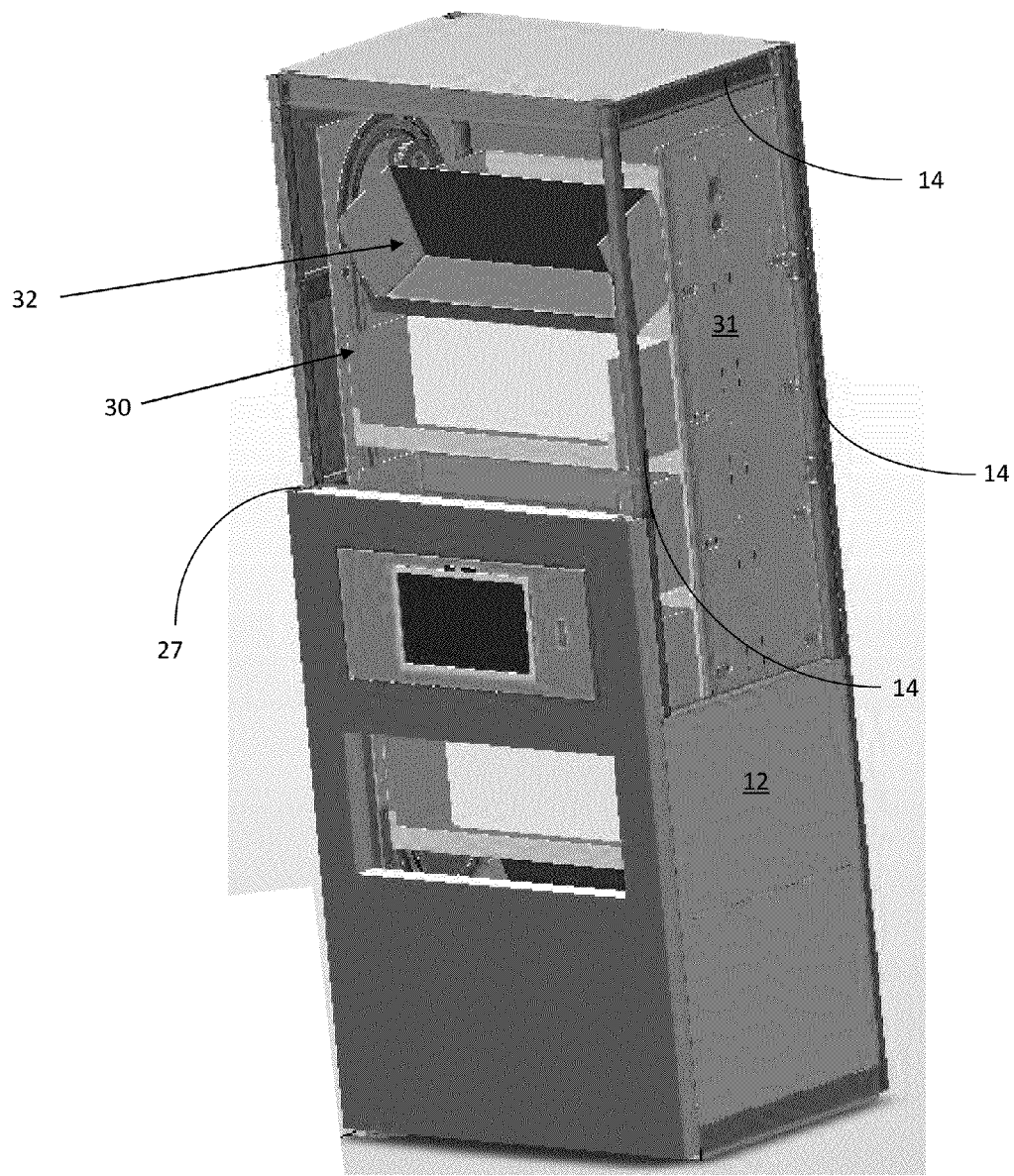
FIG. 3A provides a perspective view of the embodiment of a storage and retrieval system shown in FIG. 1 wherein certain exterior panels have been removed for clarity.
Figure 3B:
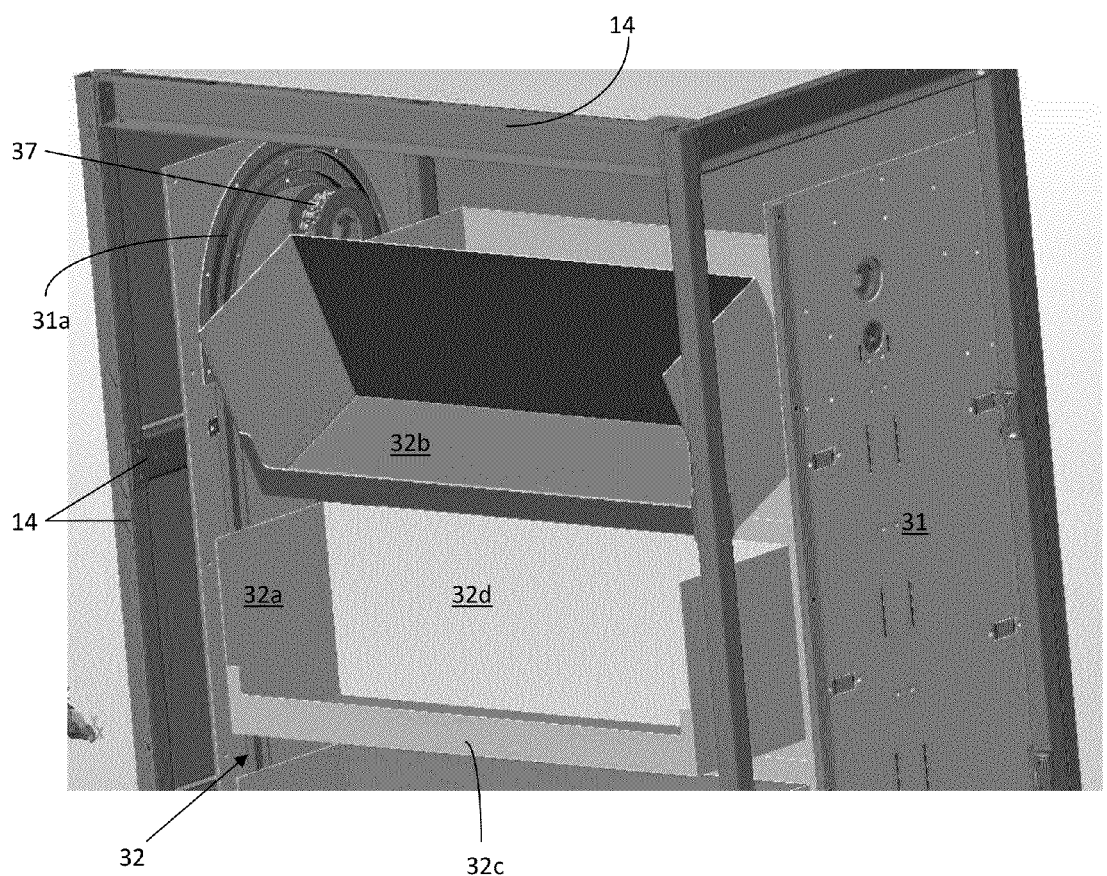
FIG. 3B provides a detailed perspective view of the top portion of the embodiment of a storage and retrieval system shown in FIGS. 1 and 3A.
Figure 3C:
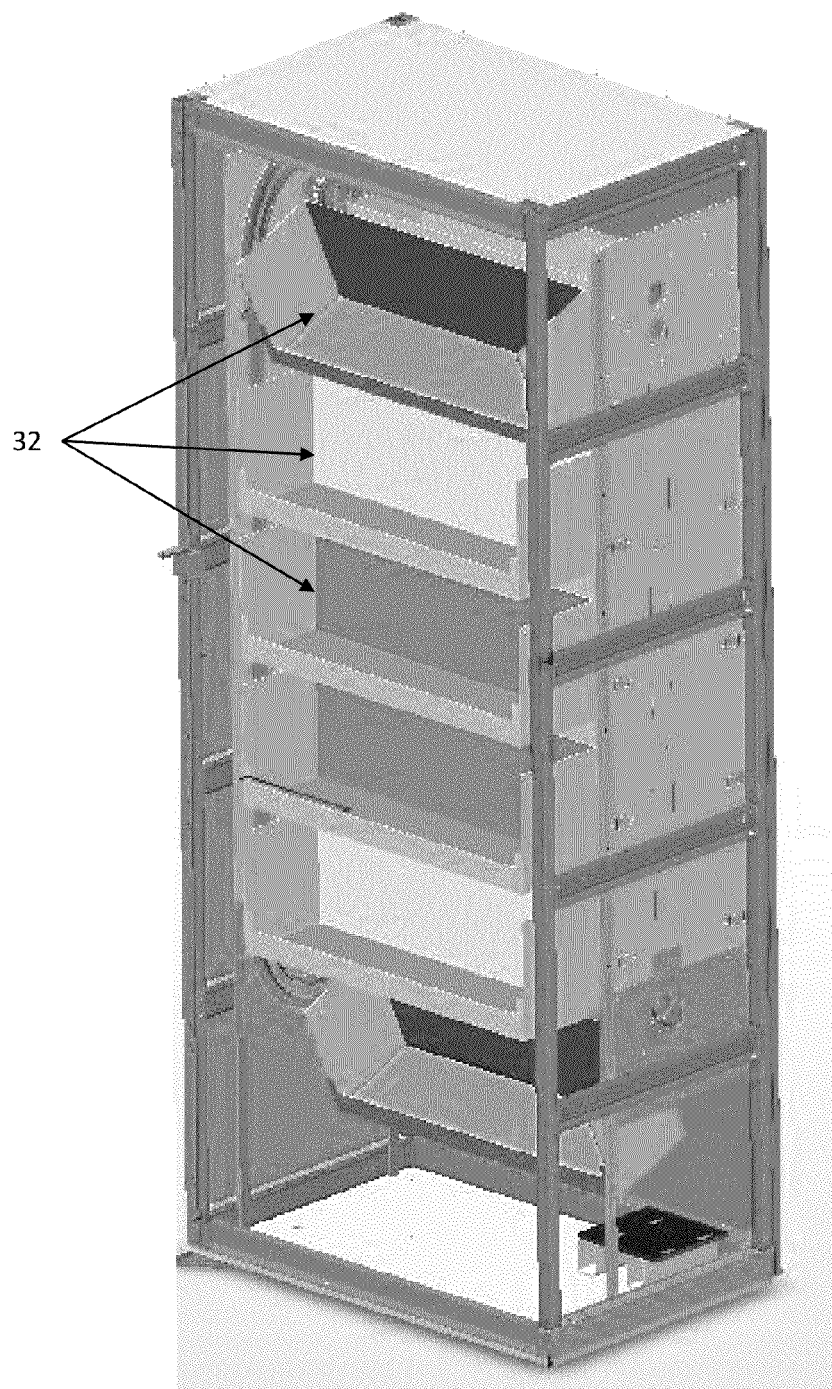
FIG. 3C provides a perspective view of the embodiment of a storage and retrieval system shown in FIG. 1 showing one illustrative embodiment of a plurality of storage members.

It is contemplated that for the illustrative embodiment, it may be advantageous to engage four generally vertically oriented frame members 12 (e.g., one at each corner of the storage and retrieval system 10) with a plurality of generally horizontally oriented frame members 12 at various positions along the height of a generally vertical frame member 12, as best shown in FIG. 3C. Accordingly, each generally horizontal frame member 12 may be engaged with at least one generally vertical frame member 12, and are shown in FIG. 3C with each end thereof engaged with different generally vertical frame members 12 such that a plurality of frame members 12 are engaged with one another to cooperate in forming a supporting frame structure for the storage and retrieval system 10. However, alterations in the structure, configuration, and/or orientation of the various frame members 12 will occur without departing from the spirit and scope of the storage and retrieval system 10 as disclosed and claimed herein.

Figure 2A:
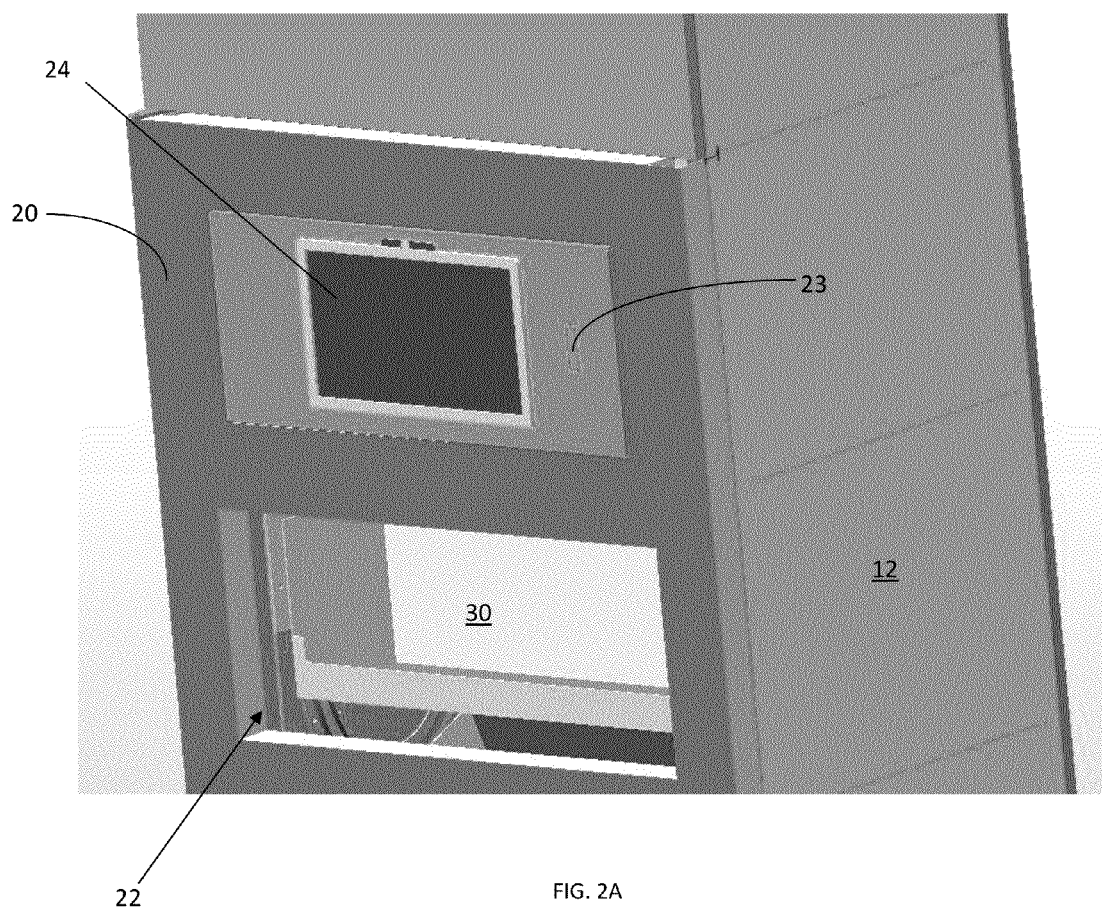
FIG. 2A provides a detailed perspective view of the embodiment of a storage and retrieval system shown in FIG. 1 adjacent an embodiment of a front exterior panel.
Figure 2B:
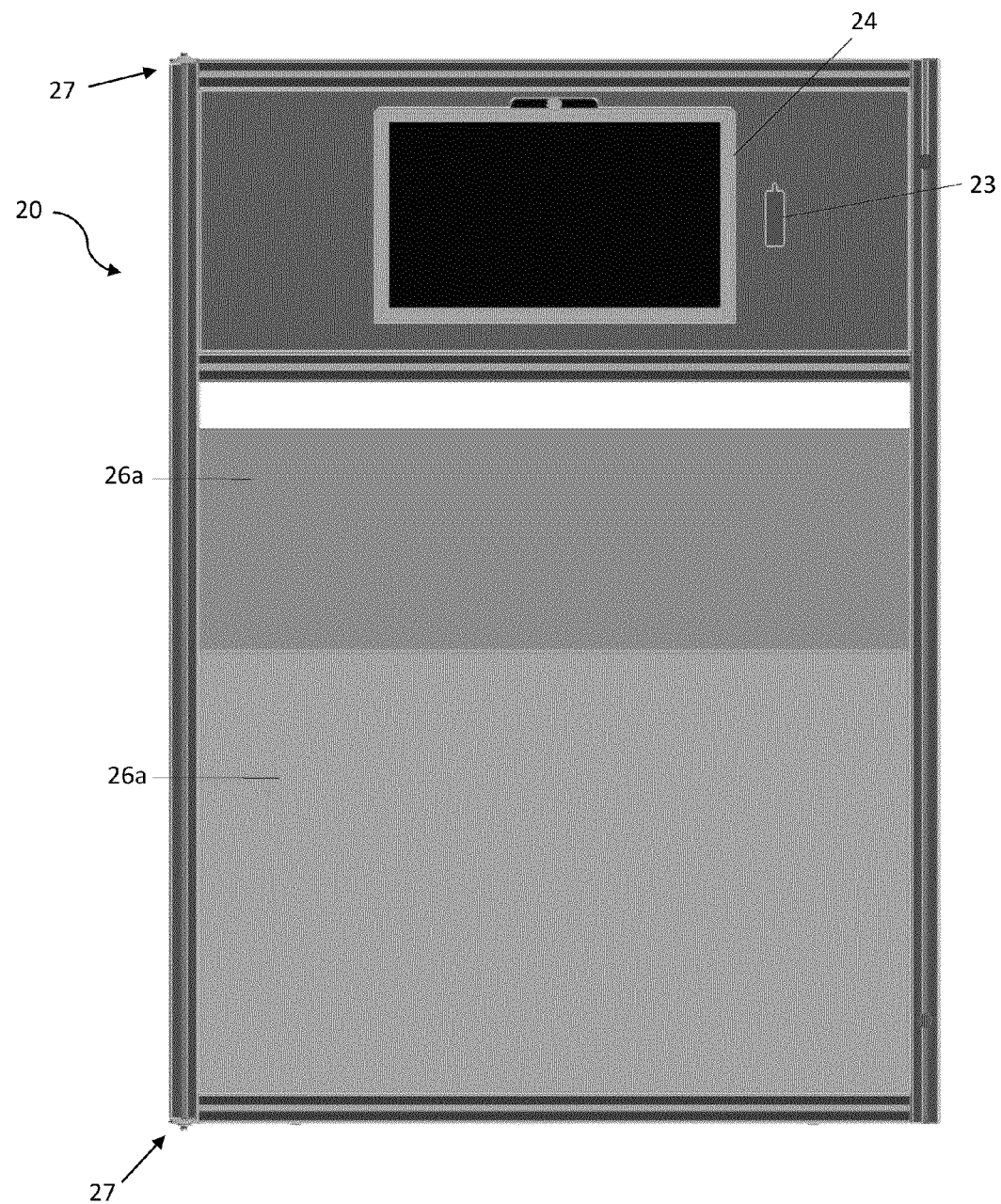
FIG. 2B provides a plain front view of the embodiment of a front exterior panel shown in FIGS. 1 and 2A.

FIG. 2A provides a detailed perspective view of the illustrative embodiment of a storage and retrieval system 10 about a first embodiment of a front exterior panel 20. The front exterior panel 20 may be engaged with one or more frame members 14 such that the front exterior panel 20 may pivot with respect to certain other elements of the storage and retrieval system 10 about one or more pivot mechanism 27, as shown in FIG. 2B. As such, the front exterior panel 20 may serve as an access or service door to the interior of the storage and retrieval system 10 in a manner similar to that of typical vending machines. Accordingly, the front exterior panel 20 may be configured with a locking mechanism (not shown) to restrict access to the interior of the storage and retrieval system 10.

The access port 22 may be configured to provide an opening that allows a user to interact with selected contents within the storage and retrieval system 10. A door flap 26 may be configured to either deny or allow access through the access port 22. In the illustrative embodiment, the door flap 26 may be configured to move in a generally vertical direction such that it slides with respect to the front exterior panel 20. As shown in FIG. 2A, the door flap 26 is in the open position, wherein the door flap 26 has slid downward to allow access to the access port 22. In other embodiments, a door flap 26 may cooperate with a lower door flap 26a. In such an embodiment the door flap 26 and lower door flap 26a may have an interface therebetween approximately at the centerline of the access port 22, wherein the door flap 26 would move upward and the lower door flap 26a would move downward to allow access to the access port 22. Alternatively, the front exterior panel 20 may be configured with right and left door flaps that move away from one another in a generally horizontal direction to allow access to the access port 22. Accordingly, the scope of the storage and retrieval system 10 is not limited by the structure and/or method used to selectively control access through the access port 22. Additionally, any structure and/or method so used may be configured as transparent to allow users to visually inspect the contents behind the access port 22 that are positioned adjacent thereto.

The door flap 26 and/or other structure and/or method used to control access through the access port 22 may be actuated (if need be) by any suitable structure and/or method suitable for the particular embodiment of the structure and/or method used to control access through the access port 22. For example, if a physical, transparent member configured as a moveable door flap 26 is used, the door flap 26 may be actuated between an open, closed, and/or partially closed position via an electrically powered actuator (e.g., solenoid) 29, pneumatic actuator 29, or any other suitable method and/or structure to provide a motive force to the door flap 26. Accordingly, the optimal structure and/or method for allowing/denying access through the access port 22 will vary from one embodiment of the storage and retrieval system 10 to the next, and is therefore in no way limiting to the scope thereof.

The front exterior panel 20 may be configured with one or more scanners 23 positioned thereon. The scanner(s) 23 may be configured as any scanner 23 that may be suitable for the particular application of the storage and retrieval system 10. For example, in a retail setting the scanner 23 may be configured as a bar code scanner or QR code scanner. In a warehouse setting, the scanner 23 may be configured as a biometric scanner, such as a retinal, fingerprint, or thumbprint scanner. Accordingly, the scope of the storage and retrieval system 10 is in no way limited by the presence of a scanner 23, the number thereof, and/or the particular type thereof.

The scanner 23 may be in communication with a locking mechanism (not shown) on the front exterior panel 20, such that recognized personnel may access the storage and retrieval system 10 not only via the access port 22, but also be opening the front exterior panel 20. Accordingly, access to the internal components of the storage and retrieval system 10 via opening of the front exterior panel 20 may be granted to a first user via the scanner 23, but denied to a second user. Simultaneously, that second user may be granted access to various items within the storage and retrieval system 10 via the access port 22, which items would most commonly be limited to the contents of specific storage members 32. However, any other configuration of a scanner 23 to allow and/or deny access to various contents and/or components of the storage and retrieval system 10 may be used therewith without limitation.

The front exterior panel 20 may also be configured with a first display 24 engaged therewith. The first display 24 may be in communication (either wired or wirelessly) with a CPU that is programmed to provide any functionality that may be desirable for the specific application of the storage and retrieval system 10. For example, if the storage and retrieval system 10 is configured for use within a retail setting, it may be advantageous to program the CPU to display a map of the retail establishment on the first display 24. Additionally, the first display 24 may be a point of user interaction if configured as a touch screen. It is contemplated that the CPU may be programmed so that the first display 24 may be configured to have a shopping cart function, which may be advantageous in a retail setting.

A second display 25 may also be mounted to the storage and retrieval system 10 above the first display 24. The second display 25 may be in communication with a CPU (which could be the same CPU in communication with the first display 24 previously mentioned) to provide content to the second display 25. It is contemplated that in a retail setting, it may be advantageous for the second display 25 to provide advertisements, which may include an audio component if the second display 25 is equipped with speakers.

As shown in FIGS. 2A & 3A, the illustrative embodiment of a storage and retrieval system 10 may include a storage assembly 30 comprising one or more storage members 32. It is contemplated that the storage assembly 30 may be positioned within the interior of the storage and retrieval system 10. The storage assemblies 32 may be of any suitable configuration for the particular application of the storage and retrieval system 10, but in the illustrative embodiment thereof may be configured primarily as shelves having one or more side surfaces 32a and a bottom surface 32b. A front ledge 32c and back wall 32c may also be employed if needed, as most clearly shown in FIG. 3B. The optimal configuration of a storage member 32 will vary from one embodiment of the storage and retrieval system 10 to the next, and will be dependent at least in part upon the contents to be placed in each storage member 32. One storage and retrieval system 10 may be configured with differently configured storage members 32, or all storage members 32 may be configured the same. Accordingly, the specific configuration of the storage members 32 in no way limits the scope of the storage and retrieval system 10.

Figure 5:
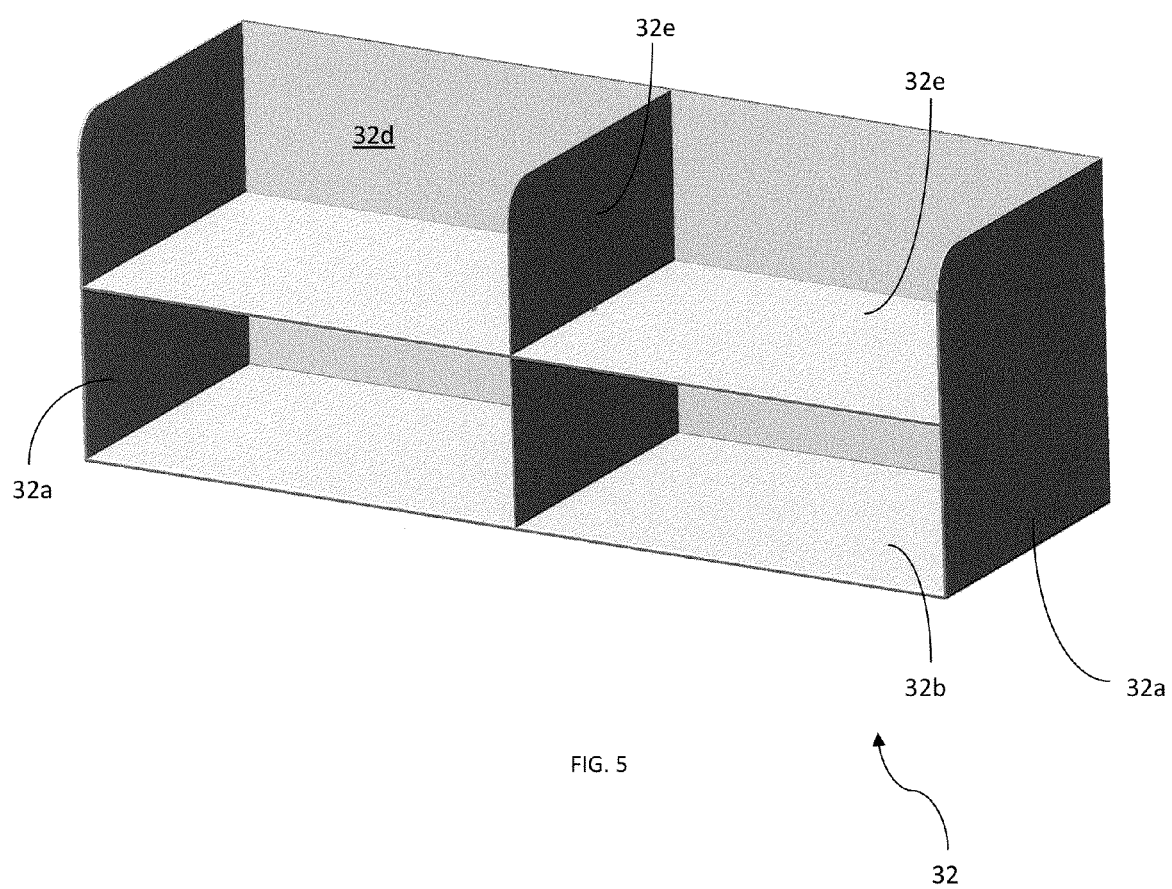
FIG. 5 provides a perspective view of a second embodiment of a storage member 32 that may be used with various embodiments of the storage and retrieval system.

A second embodiment of a storage member 32 is shown in FIG. 5. This embodiment of a storage member may be configured with multiple partitions 32e to accommodate items of varying size and/or shape on a single storage member 32. It is contemplated that the various partitions 32e may be removable and/or configured in a variety of orientations without limitation. Additionally, any storage member 32 may be configured with biasing members (not shown), such as springs, which biasing members serve to urge items away from the back wall 32d for easier access to the items through the access port 22. Any storage member 32 may also be configured such that only one of a plurality of items on a given storage member 32 is accessible through the access port 22. Such singular access to a plurality of items may be accomplished via any suitable structure and/or method for the particular embodiment of the storage and retrieval system 10. Such structures and/or methods include but are not limited to screw members, locking boxes, etc. Accordingly, the presence and/or specific structure and/or method for singular access to a specific item from a plurality of items on a given storage member 32 in no way limits the scope of the storage and retrieval system 10 as disclosed and claimed herein.

Figure 6:
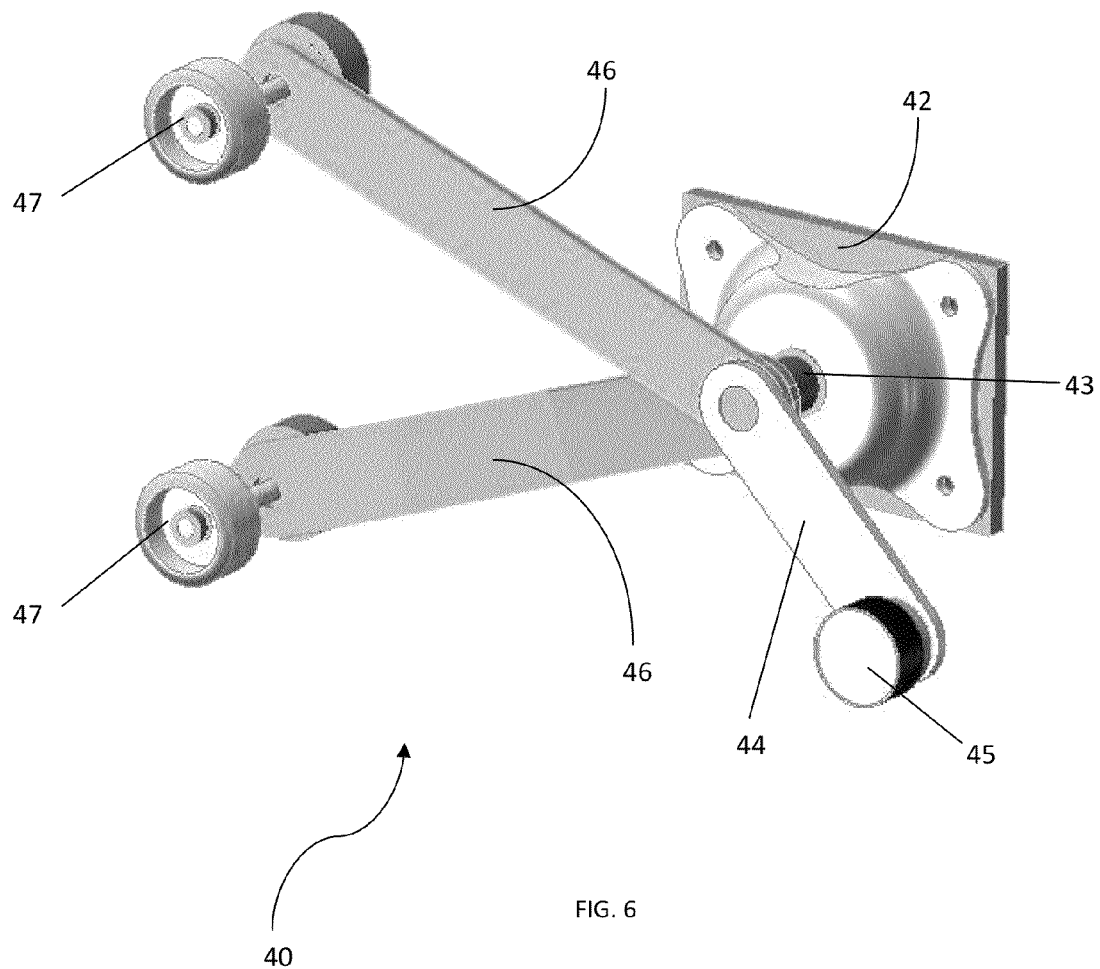
FIG. 6 provides a detailed perspective view of an illustrative embodiment of a positioning assembly that may be used with the storage and retrieval system.

A storage member 32 may be configured to interact with the storage assembly 30 in any manner suitable for the particular application of the storage and retrieval system 10. One embodiment of a positioning assembly 40 as shown in FIG. 6 may comprise a plate 42 for engagement with a storage member 32. In the illustrative embodiment it is contemplated that the plate 42 may engage the storage member 32 on the exterior of the side surface 32a, and that a positioning assembly 30 may be engaged with one or both side surfaces 32a of a storage member 32.

The positioning assembly 40 may be formed with a pin 43 extending from the plate 42, wherein the pin 43 may be securely engaged with the plate 42 such that neither may rotate with respect to the other. A fixed arm 44 may be engaged with the pin 43 such that the fixed arm 44 does not rotate with respect to the pin 43 (and consequently with respect to the plate 42 and storage member 32 with which the plate 42 is engaged). The distal end of the fixed arm 44 may be configured as a roller 45 for placement within the guide 31a, such that the roller 45 may move along the guide 31a with minimal friction/resistance. The roller 45 and/or guide 31a may be formed of complimentary materials to reduce the friction therebetween, which materials include but are not limited to Teflon®, polymers, natural materials, other materials, and/or combinations thereof.

The positioning assembly 40 may also include one or more pivot arms 46 that may be pivotally engaged with the pin 43 at a first end of the pivot arm 46. The distal end of the pivot arm 46 may be formed as a connector 47 and engaged with the coupling member 37, which engagement may also be in a pivotal manner. However, in the illustrative embodiment of a positioning assembly 40 it is contemplated that the connector 47 may advantageously engage the coupling member 37 in a non-pivotal, rigid arrangement. In this manner, the mechanical energy from the drive member 36 may be communicated to a storage member 32 first through a coupling member 37 and then through one or more pivot arms 46 of a positioning assembly 40 engaged with the storage member 32. Accordingly, the storage member 32 and positioning assembly 40 may be configured such that the orientation of the fixed arm 44 with respect to the storage member 32 and the shape of the guide 31a determine the orientation of the storage member 32 with respect to the side plates 31, front exterior panel 20, frame members 14, etc. However, other structures and/or methods may be used to determine the orientation of a storage member 32 with respect to other elements of the storage and retrieval system 10 without departing from the spirit and scope thereof.

Using the illustrative embodiment of a positioning assembly 40 shown in FIG. 6, the storage assembly 30 may be configured to vary the yaw, pitch, and/or roll of a storage member 32 at a specific position along the guide 31a. For example, adjusting the shape of the guide 31a in the fore/aft dimension (from a vantage in front of the front exterior panel 20) may cause a storage member 32 to tilt forward for a certain length of the guide 31a. Such a configuration may be advantageous for ensuring that items positioned on a storage member 32 are located away from the back wall 32d of the storage member 32.

The storage assembly 30 may be configured to indexably move a plurality of storage members 32 about a predetermined path, wherein each storage member 32 may pause in an area adjacent the access port 22 such that a user may view and/or interact with the contents positioned on that particular storage member 32. One or more storage members 32 may be engaged with one another via a coupling member 37. In the illustrative embodiment of a storage assembly 30, the coupling member 37 may be configured as a link chain, belt, and/or any other structure that is suitable to communicate motive forces from a drive member 36 to a storage member 32 and/or from one storage member 32 to another.

The illustrative embodiment of a storage and retrieval system 10 with various exterior panels 12, frame members 14, and the front exterior panel 20 removed for clarity is shown in FIG. 3C. In the illustrative embodiment, the storage assembly 30 may be configured such that a plurality of storage members 32 is moveable within a generally elliptical circuit. To facilitate movement of the storage members 32, the storage assembly 30 may be configured with a drive member 36 and a coupling member 37. It is contemplated that the drive member 36 may be mounted within the storage and retrieval system 10, but it may be mounted exterior thereto without limitation.

In the illustrative embodiment of the storage assembly 30, the drive member 36 may be configured as a sprocket engaged with a motive energy source (not shown), such as an electric or pneumatic motor. However, in other embodiments the motive energy source may be integrally formed with the drive member 36. In the illustrative embodiment of the storage assembly 30, the drive member 36 may be engaged with a sprocket, pulley, and/or any other structure that is suitable to communicate a motive force to one or more storage members 32 and/or coupling member 37.

Figure 4A:
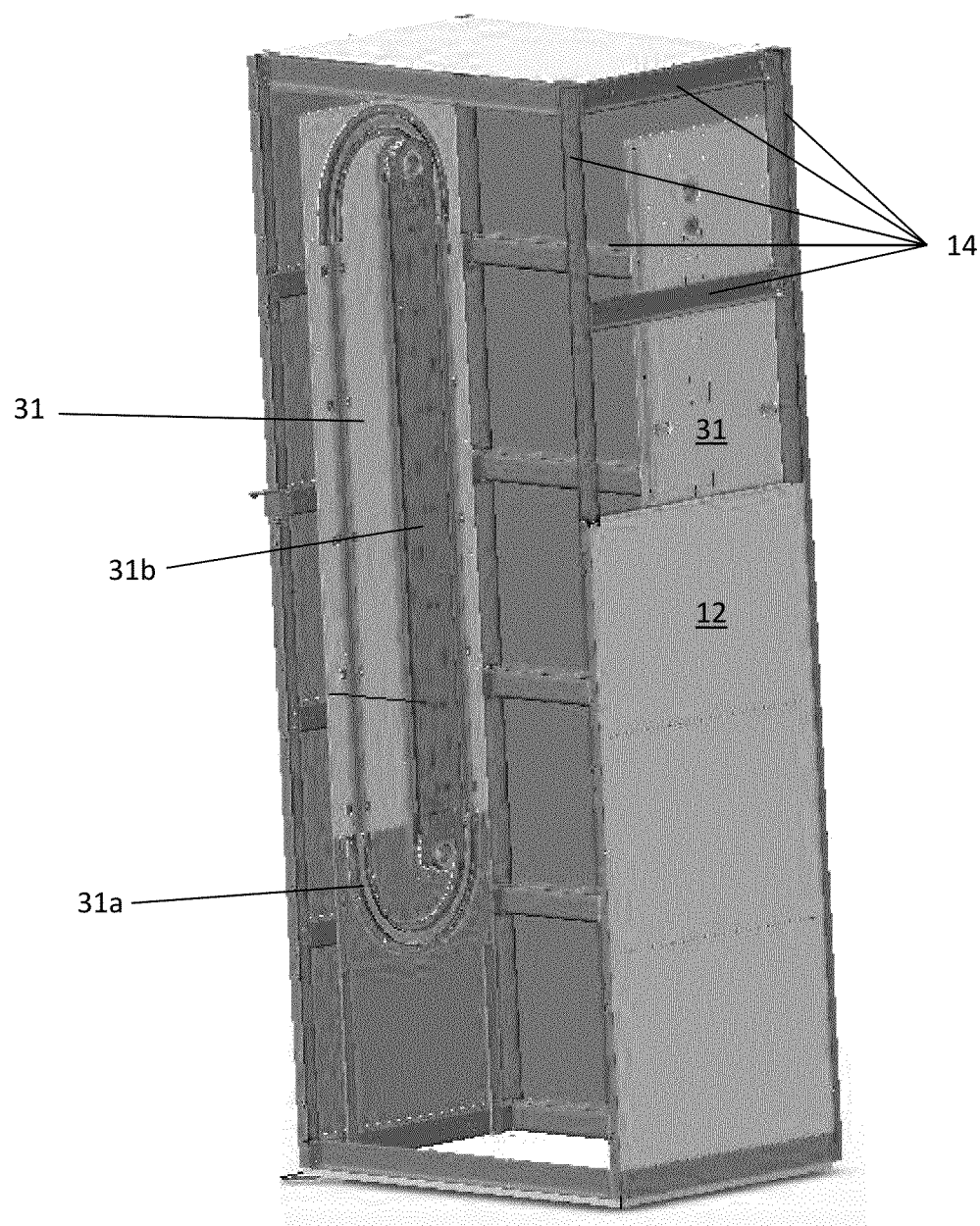
FIG. 4A provides a perspective view of the embodiment of a storage and retrieval system shown in FIGS. 1 and 2A wherein various exterior panels and elements of the storage assembly have been removed for clarity.
Figure 4B:
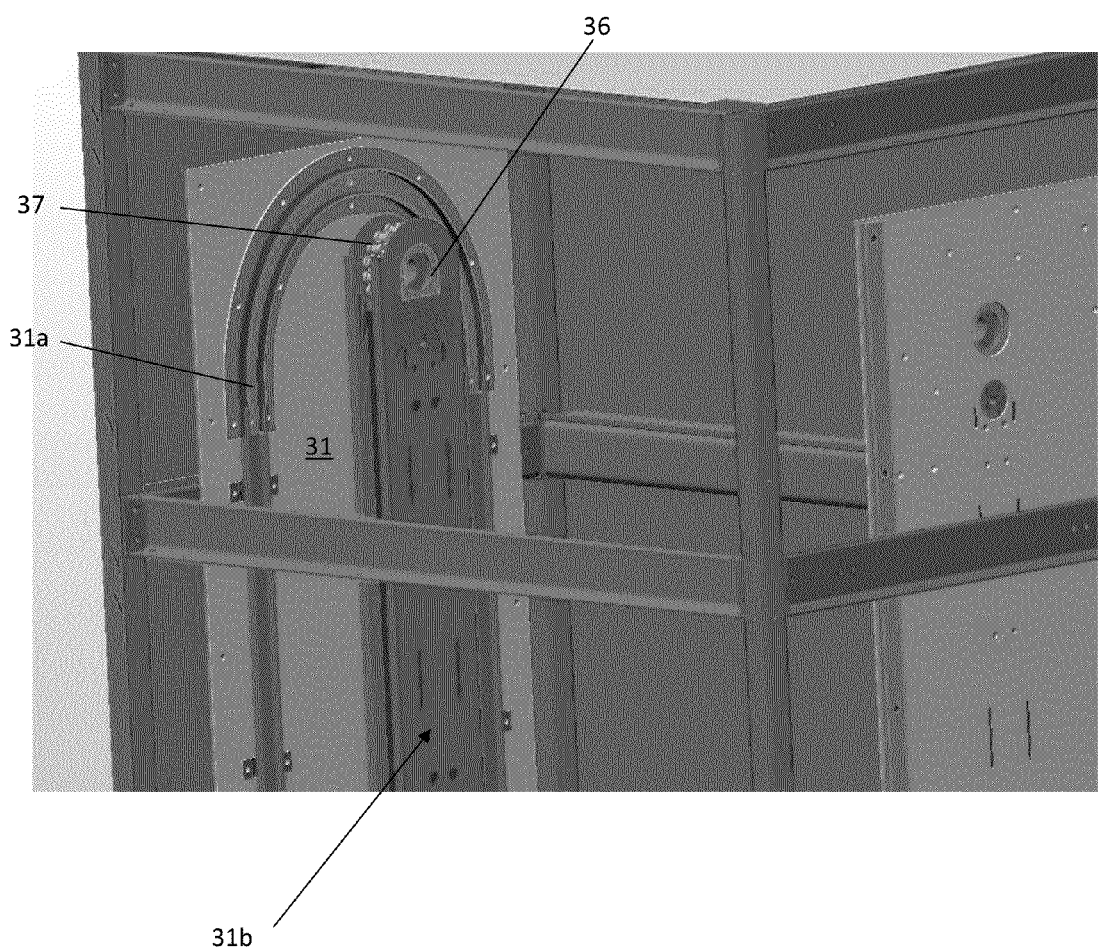
FIG. 4B provides a detailed perspective view of the top portion of the embodiment of a storage and retrieval system as shown in FIG. 4A.

The illustrative embodiment of a storage assembly 30 mounted within a plurality of frame members 14 is shown in perspective in FIG. 4A. As may be seen in FIG. 4A, one or more side plates 31a may be engaged with one or more frame members 14. A detailed view of the top portion of the illustrative embodiment of a storage assembly 30 is shown in FIG. 4B. Each side plate 31 may be formed with a guide 31a therein. Generally, the guide 31a may be configured to dictate the shape and constraints of the circuit for the storage members 32. Accordingly, in the illustrative embodiment the guide 31a may be generally elliptically shaped, but the scope of the storage and retrieval system 10 is not so limited and extends to any shape and/or configuration of a guide 31a without limitation.

As shown in FIGS. 4A & 4B, a drive keeper 31b may be engaged with the side plate 31 on the interior portion thereof. In the illustrative embodiment, the drive keeper 31b may be configured as a track and/or pathway in which the coupling member 37 may reside and may also provide an engagement location for the drive member 36. The drive keeper 31b may be configured such that the coupling member 37 and/or drive member 36 are fully enclosed within the drive keeper 31b to mitigate the possibility of foreign objects interfering with the operation of either the coupling member 37 and/or drive member 36.

Various safeguards and/or other safety features may be integrated into the access port 22 to protect contents of the storage and retrieval system 10 and/or personnel using the storage and retrieval system 10. For example, in the illustrative embodiment it is contemplated that an invisible light curtain system may be projected across the access port 22. The structure and/or method controlling access to the access port 22 may be in communication with a logic circuit that is also in communication with the drive member 36 and/or light curtain system (which may reside on a central CPU in communication with other electrical components of the storage and retrieval system 10). The logic circuit may be configured such that if the light curtain system detects an object within the access port 22, the drive member 36 and/or structure and/or method controlling access to the access port 22 may be immobilized. Such a safeguard would mitigate the likelihood of the storage assembly 30 becoming inadvertently energized when a user is attempting to interact with a storage member 32 and/or other object through the access port 22.

Another safeguard that may be incorporated into the access port 22 to protect items and/or users is a pressure sensor(s) 28 placed along the edge of the door flap 26 and/or lower door flap 26b. The pressure sensor(s) 28 may be in communication with a CPU and/or logic circuit that is simultaneously in communication with the structure and/or method for actuating the door flap 26 and/or lower door flap 26a. Accordingly, if the pressure sensor 28 experiences a pressure beyond a predetermined set point, the CPU and/or logic circuit may cause the direction of the door flap 26 and/or lower door flap 26a to reverse.

Additionally, each storage member 32 may be configured with a touch and/or pressure sensor(s) (not shown) along a portion thereof. These various sensors may be in communication with a CPU and/or logic circuit that is simultaneously in communication with the structure and/or method for actuating the door flap 26 and/or lower door flap 26a. Accordingly, the sensors on the storage members 32 experience touch and/or pressure at a predetermined amount, the drive member 36 may become idle such that the storage members 32 do not inadvertently move. Sensors on the storage members 32 may also provide a safeguard against items inadvertently falling from the storage member 32 into an area in which it may interfere with the internal components of the storage and retrieval system 10.

Finally, an emergency stop switch (not shown) may be positioned in a readily accessible position on the exterior of the storage and retrieval system 10. It is contemplated that the emergency stop switch may be in direct communication with the power supply for the storage and retrieval system 10 and/or the drive member 36. Accordingly, depending on the configuration of the emergency stop switch, pressing the emergency stop switch may cause the entire storage and retrieval system 10 to power off, or it may immobilize the storage assembly 30 such that now storage members 32 can move. It is contemplated that the CPU and/or logic circuit in communication with the various sensors of the storage and retrieval system 10 may be configured such that in the event that one of the sensors and/or switches fails and/or provides any indication that it is malfunctioning, the CPU and/or logic circuit will default to a power down/immobilization state for the drive member 36 such that the storage members 32 do not move.

It is contemplated that the various features/aspects/components of the storage and retrieval system 10 may communicate with one another for optimal ease of use. For example, the scanner 23 and first display 24 and/or second display 25 may work in conjunction such that a user may bring empty packaging having a bar code, scan the bar code with the scanner 23, and thereby cause the first display 24 and/or second display 25 to show the location of that item on a store map (or indicate whether a similar item is available in the storage and retrieval system 10 itself). Additionally, the scanner 23 and first display 24 and/or second display 25 may work in conjunction such that when a user scans a bar code or product code, more information, advertisements, alternatives, etc. are displayed on the first display 24 and/or second display 25.

The storage and retrieval system 10 may also be configured with a radio frequency identification (RFID) system. Such an embodiment may provide real time inventory of items within the storage and retrieval system 10, as a sensor (not shown) may be located adjacent the access port 22 such that a CPU in communication with the RFID system will update the quantity of items within the storage and retrieval system 10 when an item having an RFID tag is removed through the access port 22. An administrative user may update the quantity of items during restocking or other actions that require the front exterior panel 20 to be opened/unlocked.

The storage and retrieval system 10 may also be configured with a magnetic strip reader, such as one used in credit card and/or debit card transactions. If the first display 24 is configured as a touchscreen, a virtual keypad may be displayed by a properly programmed CPU in communication with the first display 24. If so equipped, the storage and retrieval system 10 may serve as a point-of-sale device, wherein a customer may select and item to purchase, pay for the item, and then remove the item through the access port 22 without need for additional personnel and/or interactions. To navigate the contents displayed on the first display 24, the storage and retrieval system 10 may be configured with a trackball positioned adjacent the first display but at a height that is accessible from a wheelchair.

A CPU in communication with the storage assembly 30 and/or drive member 36 may be programmed so that when a user desires access to storage member 32 that is not adjacent the access port 22, the drive member 36 moves the coupling member 37 either clockwise or counterclockwise, depending on the shortest path from the desired storage member 32 to the access port 22.

If the storage and retrieval system 10 is configured for use with foodstuffs, or with other items requiring a controlled climate, the storage and retrieval system 10 may be configured with an HVAC system (not shown). The HVAC system may be configured to control the temperature, humidity, and/or other environmental characteristics within the storage and retrieval system 10. The storage and retrieval system 10 may also be configured with a microwave, toaster, toaster oven, and/or other food preparation components adjacent or within the front exterior panel 20 as suitable for the particular application of the storage and retrieval system 10.

The storage and retrieval system 10 and various elements thereof may be constructed of any suitable material known to those skilled in the art. In the embodiment as pictured herein, it is contemplated that most elements will be constructed of metal or metallic alloys, polymers, or combinations thereof. However, other suitable materials may be used without limitation.

It should be noted that the storage and retrieval system 10 and various elements thereof are not limited to the specific embodiments pictured and described herein, but is intended to apply to all similar apparatuses and methods for conveniently storing, recalling, retrieving, and/or otherwise managing items. Modifications and alterations from the described embodiments will occur to those skilled in the art without departure from the spirit and scope of the storage and retrieval system 10.

Furthermore, variations and modifications of the foregoing are within the scope of the storage and retrieval system 10. It is understood that the storage and retrieval system 10 as disclosed and defined herein extends to all alternative combinations of two or more of the individual features and/or methods mentioned or evident from the text and/or drawings. All of these different combinations constitute various alternative aspects of the storage and retrieval system 10. The embodiments described herein explain the best modes known for practicing the storage and retrieval system 10 and will enable others skilled in the art to utilize the same. The claims are to be construed to include alternative embodiments to the extent permitted by the prior art.

What is claimed is:

1. A storage and retrieval system comprising:
   a. a plurality of frame members engaged with one another to form a supporting frame structure;
   b. a storage assembly engaged with said supporting frame structure, said storage assembly comprising:
      i. a plurality of storage members, wherein said plurality of storage members is configured to be moveable about a circuit within said storage assembly, and wherein each said individual storage member is configured to hold one or more items;
      ii. a drive member mounted within said supporting frame structure, wherein said drive member is engaged with said plurality of storage members such that mechanical energy from said drive member may be communicated to said plurality of storage members;
   c. a front exterior panel mounted to said frame structure, wherein said front exterior panel comprises:
      i. an access port, wherein said access port allows a user to interact with at least one said storage member from a position exterior to said supporting frame structure;
      ii. a door flap selectively moveable to block said access port via a door flap actuator;
      iii. a first display positioned above said access port;
      iv. an invisible light curtain positioned over said access port;
   d. a central processing unit in communication with said drive member, said door flap actuator, said invisible light curtain, and said first display, wherein said central processing unit is configured to prevent said door flap actuator from closing said door flap when an object is positioned in said light curtain wherein said door flap is further defined as having a pressure sensitive edge formed thereon, wherein said pressure sensitive edge is in communication with said central processing unit such that when said pressure sensitive edge is activated said door flap actuator opens said door flap.

2. The storage and retrieval system according to claim 1 wherein said storage assembly further comprises:
   a. a first side plate affixed to said supporting frame structure, wherein a guide is fashioned on an interior surface of said first side plate;
   b. a second side plate opposing said first side plate, wherein said second side plate is affixed to said supporting frame structure, wherein a second guide is fashioned on an interior surface of said second side plate, and wherein the dimensions and orientation of said guide and said second guide are substantially mirror images of on another; and, c. a coupling member engaged with said plurality of storage members, wherein said coupling member communicates mechanical energy from said drive member to said plurality of storage members.

3. The storage and retrieval system according to claim 2 wherein each said storage member in said plurality of storage member further comprises a positioning assembly, said positioning assembly comprising:

a. a plate engaged with a side surface of said storage member;

b. a pin engaged with said plate, wherein said pin extends outward from said plate;

c. a fixed arm engaged with said pin, wherein a roller is engaged with a distal end of said fixed arm, and wherein said fixed arm does not pivot with respect to said pin; and d. at least one pivot arm engaged with said pin, wherein a connector is engaged with a distal end of said at least one pivot arm, wherein said pivot arm may pivot with respect to said pin, and wherein said connector is engaged with said coupling member such that said pivot arm does not pivot with respect to said coupling member about said connector.

4. The storage and retrieval system according to claim 3 wherein said first side plate further comprises a drive keeper, and wherein said coupling member is further defined as being positioned within said drive keeper.

5. The storage and retrieval system according to claim 4 wherein said coupling member is further defined as a link chain.

6. The storage and retrieval system according to claim 5 wherein said drive member is further defined as a sprocket configured to receive rotational energy from an electric motor.

7. The storage and retrieval system according to claim 4 wherein said coupling member is further defined as a belt.

8. The storage and retrieval system according to claim 7 wherein said drive member is further defined as a pulley configured to receive rotational energy from an electric motor.

9. A storage and retrieval system comprising:

a. a first, second, third, and fourth generally vertical frame members configured to form a rectangle;

b. a plurality of generally horizontal frame members engaged with at least one of said first, second, third, and fourth generally vertical frame members such that said first, second, third, and fourth generally vertical frame members and said plurality of generally horizontal frame members form a supporting frame structure;

c. a storage assembly engaged with said supporting frame structure, said storage assembly comprising:

i. a first side plate having a guide formed on an interior surface thereof, wherein a drive keeper is engaged with said first side plate adjacent said guide;

ii. a second side plate opposite said first side plate, wherein said second side plate has a guide formed on an interior surface thereof, wherein a drive keeper is engaged with said first side plate adjacent said guide, and wherein said guide and said drive keeper on said first side plate are substantially mirror images of said guide and said drive keeper on said second side plate;

iii. a plurality of storage members supported by said first and second side plates, wherein each said storage member is engaged with an adjacent said storage member via a coupling member, wherein said plurality of storage members is configured to be moveable about said guides and said drive keepers, and wherein each said individual storage member is configured to hold one or more items;

iv. a drive member mounted within said supporting frame structure adjacent said drive keeper on said first side plate, wherein said drive member is engaged with said coupling member such that mechanical energy from said drive member may be communicated to said plurality of storage members;

d. a front exterior panel mounted to said frame structure, wherein said front exterior panel comprises:

i. an access port, wherein said access port allows a user to interact with at least one said storage member from a position exterior to said supporting frame structure;

ii. a door flap selectively moveable to block said access port via a door flap actuator;

iii. a first display positioned above said access port;

iv. an invisible light curtain positioned over said access port;

e. a central processing unit in communication with said drive member, said door flap actuator, said invisible light curtain, and said first display, wherein said central processing unit is configured to prevent said door flap actuator from closing said door flap when an object is positioned in said light curtain wherein said door flap is further defined as having a pressure sensitive edge formed thereon, wherein said pressure sensitive edge is in communication with said central processing unit such that when said pressure sensitive edge is activated said door flap actuator opens said door flap.

10. The storage and retrieval system according to claim 9 wherein each said storage member in said plurality of storage member further comprises a positioning assembly, said positioning assembly comprising:

a. a plate engaged with a side surface of said storage member;

b. a pin engaged with said plate, wherein said pin extends outward from said plate;

c. a fixed arm engaged with said pin, wherein a roller is engaged with a distal end of said fixed arm, and wherein said fixed arm does not pivot with respect to said pin; and d. at least one pivot arm engaged with said pin, wherein a connector is engaged with a distal end of said at least one pivot arm, wherein said pivot arm may pivot with respect to said pin, and wherein said connector is engaged with said coupling member such that said pivot arm does not pivot with respect to said coupling member about said connector.

11. The storage and retrieval system according to claim 10 wherein said first side plate further comprises a drive keeper, and wherein said coupling member is further defined as being positioned within said drive keeper.

12. The storage and retrieval system according to claim 11 wherein said coupling member is further defined as a link chain.

13. The storage and retrieval system according to claim 12 wherein said drive member is further defined as a sprocket configured to receive rotational energy from an electric motor.

14. The storage and retrieval system according to claim 11 wherein said coupling member is further defined as a belt.

15. The storage and retrieval system according to claim 14 wherein said drive member is further defined as a pulley configured to receive rotational energy from an electric motor.

16. A method of storing and retrieving an item comprising the steps of:
   a. positioning an item on a specific storage member of a plurality of storage members, wherein said plurality of storage members are engaged with one another via a coupling member;
   b. providing a first display on a front exterior panel of a storage and retrieval system, wherein said plurality of said storage members is positioned within said storage and retrieval system, and wherein said front exterior panel is formed with an access port therein configured to allow a user to interact with at least one said storage member of said plurality of storage members when said at least one storage member is positioned adjacent said access port;
   c. selectively closing said access port via a door flap engaged with a door flap actuator;
   d. positioning an invisible light curtain over said access port;
   e. allowing a user to query said storage and retrieval system through said first display so that said user can determine if said plurality of storage members contains said item;
   f. engaging a drive member with a rotational energy source;
   g. engaging said drive member with said plurality of storage members;
   h. allowing said user to position said storage member on which said item is positioned to an area adjacent said access port via said first display such that said user may retrieve said item; and,
   i. providing redundant systems to prevent said user becoming inadvertently engaged with an internal element of said storage and retrieval system via controlling said light curtain, said door flap actuator, and said drive member with a central processing unit, wherein a first system comprises ensuring said user does not become inadvertently engaged with any element of said storage and retrieval system during use by preventing said door flap actuator from closing said door flap when an object is positioned in said light curtain, and wherein a second system comprises immobilizing said drive member when said door flap is not closed, and wherein a third system comprises a pressure sensor positioned on a leading edge of said door flap, such that when said pressure sensor encounters a predetermined amount of pressure, said door flap actuator opens said door flap.

* * * * *